United States Patent [19]

Schuler

[11] 4,308,476
[45] Dec. 29, 1981

[54] BAR WINDINGS FOR ELECTRICAL MACHINES

[75] Inventor: Roland Schuler, Wettingen, Switzerland

[73] Assignee: BBC Brown Boveri & Co. Ltd., Baden, Switzerland

[21] Appl. No.: 634,186

[22] Filed: Nov. 21, 1975

[30] Foreign Application Priority Data

Dec. 4, 1974 [CH] Switzerland .................. 16082/74

[51] Int. Cl.³ .......................................... H02K 15/12
[52] U.S. Cl. .................................... 310/45; 310/64; 310/213; 310/215; 174/34
[58] Field of Search ................. 310/45, 43, 60 A, 213, 310/214, 215, 64, 194; 174/34, 117

[56] References Cited

U.S. PATENT DOCUMENTS

| | | | |
|---|---|---|---|
| 2,707,204 | 4/1955 | Richardson | 310/45 |
| 2,783,399 | 2/1957 | Fenemore | 310/213 |
| 2,821,641 | 1/1958 | Ringland | 310/213 |
| 3,214,617 | 10/1965 | Tudge | 310/213 |
| 3,254,150 | 5/1966 | Rogers | 310/45 |
| 3,594,597 | 7/1971 | Kildishev | 310/214 |

FOREIGN PATENT DOCUMENTS

| | | | |
|---|---|---|---|
| 612212 | 4/1935 | Fed. Rep. of Germany | 310/213 |
| 1030921 | 5/1958 | Fed. Rep. of Germany | 310/213 |
| 2423020 | 6/1975 | Fed. Rep. of Germany | 310/214 |
| 1374440 | 8/1964 | France | 310/214 |
| 963790 | 7/1964 | United Kingdom | 310/214 |

Primary Examiner—R. Skudy
Attorney, Agent, or Firm—Toren, McGeady & Stanger

[57] ABSTRACT

A large electrical machine, includes bar windings composed of twisted individual conductors with irregularities formed at the narrow edges of the bar winding. The bar winding is composed of individual insulated conductors and uninsulated conductors. A synthetic mica-resin putty pressed between the conductors fills the spaces between the conductors. Electrically conductive strips covering the putty are electrically connected to the uninsulated conductors.

3 Claims, 3 Drawing Figures

BAR WINDINGS FOR ELECTRICAL MACHINES

BACKGROUND OF THE INVENTION

This invention relates to electrical machines such as motors and generators, and particularly to bars which form part of the windings on large electrical machines as well as methods for producing such bars.

The windings of large electrical machines possess series connected rods whose cross sections are divided into mutually insulated single or individual conductors. This serves to reduce the additional current-produced heat losses. The individual conductors are twisted about each other at least over the entire length of the iron portion so that each partial conductor undergoes at least one complete helical turn, i.e., a 360° turn of uniform pitch, while passing through a groove. In this manner all single or individual conductors interlink with equally large fluxes transverse to the groove. Only the current caused heat losses resulting from the small height and width of the single conductors, which may, for example, be in the form of Roebel rods, remains.

In conventional copper conductors of rectangular cross section this structure results in cross-overs of the single or individual conductors and in conductor bundles having cross-sections of varying configurations, particularly at the narrow sides of the conductor bundles or packs. This is particularly characteristic of a conventional bar structure, where the conductors pack is cooled by means of interspersed hollow conductors, because these hollow conductors often have larger cross sections than the solid conductors.

Prior to applying the principal or main insulation, it is therefore necessary to use suitable measures to make sure that the conductor bundle is rectangular over the total length of the bar. Failure to apply the insulation with adequate air exclusion, can cause internal discharges due to high operational electric fields. The resulting gaps occurring on the narrow sides of the single or individual conductor cross-over regions must be filled with a suitable filler material (i.e. white zinc bakelite paste or pigmented epoxy resin) so that the bar insulation (is applied) without air entrapment in the bar. See the book by Wiedemann and Kellenberger, entitled "Konstruktion Electrischer Machinen", published by Springer 1967, page 292. The surface of the conductors is often painted with resins containing fillers to fill in all remaining irregularities and to make possible substantially airless installation of the principal or main insulation. See the book by Sequenz, entitled "Herstellung der Wicklungen Electrischer Machinen", published by Springer 1973, page 148. However, only small irregularities can be filled in this manner. Therefore, a structure devoid of air pockets is not normally practical.

It is also possible to fill in irregularities on the narrow sides or edges of the bar windings with wedges of solid insulation material. This method is also suitable for filling larger surface notches. However fitting wedges into a large number of notches is very uneconomical and difficult to do.

It is therefore an object of the invention to produce a bar-winding with twisted single or individual conductors for electrical machines, and a process for its manufacture which avoids the disadvantages of known windings and methods.

Another object of the invention is to produce a better bar structure by means of a simplified and economical process.

SUMMARY OF THE INVENTION

According to an aspect of the invention, these objects are achieved in whole or in part, by filling the irregularities on the narrow sides of the bar winding, composed of insulated single or individual conductors and bare or uninsulated single or individual conductors, with a synthetic mica resin putty pressed therein and covering the putty with an electrically conductive strip. The electrically conductive strip is electrically interconnected with the bare or ininsulated single or individual conductors of the bar winding.

The invention offers a number of advantages. The pressed on synthetic mica-(filled) resin putty permits superior filling of relatively large irregularities in an economical manner and additionally, because of the putty's approximately 70% mica content, smaller inhomogeneities within the filling are of no consequence. The electrically conductive strip arranged over the narrow sides or ends of the bar winding serves as an electrostatic shield and its conductive coupling with the single or individual conductors of the bar winding improves the homogeneity of the electric field within the main-insulation, which as a result, can be more fully utilized. A further advantage of this electrically conductive strip arises from the fact that its resistance value, which is of great significance for operation of the electrical machine, is accurately measurable prior to its insertion into the bar. This has not hitherto been possible using conventional conductive coating materials and pastes. This resistance value does not change further during the course of the continuing manufacturing process. The resistance values of known thin protective mica varnishes change upon later impregnation of the principal or main insulation. Such variations do not occur in the electrically conductive strip.

According to another aspect of the invention the electrically conductive strip is composed of a mechanically reinforced synthetic material, preferably glass-fiber reinforced material. According to still another aspect of the invention the electrically conductive strip has rounded outer edges. These permit improved wrapping of the main insulation around the bar-winding while avoiding damage to the insulating ribbons by sharp corners and result in homogeneous field distribution.

According to yet another aspect of a structure composed of a bar-winding with twisted solid conductors and interspersed hollow conductors, only the solid conductors, in contrast to the interspersed hollow conductors, possess individual insulation. The advantage of this construction can be seen in the economy of eliminating insulation for the hollow conductors and ensuring that the bare or uninsulated hollow conductors maintain good contact with the electrically conductive strip.

According to one embodiment of the invention, the bar-winding is fabricated as follows:

A strip of the synthetic mica-resin putty, in a partially hardened state at a temperature range of 150–200 degrees, is placed on the narrow sides or ends of the bar-winding exhibiting any irregularities and then pressed therein and allowed to harden. An advantage of this process arises from being able to fill all the recesses on the narrow edges of the bar-winding adequately and simply. According to an embodiment, an electrically conductive synthetic resin adhesive secures an electrically conductive strip to the narrow edges or sides of the bar-winding in the region of the transition locations of the uninsulated single conductors. Glueing the electrically conductive strip onto the narrow edge of the bar-winding constitutes an economical way of producing not only good mechanical but also good electrically conductive bond between the indicated parts. According to another aspect, an electrically conductive strip is pressed directly onto the narrow edges of the bar-winding at the same time as the synthetic mica-resin putty.

The invention accordingly permits fabrication of a homogeneous bar with accurately defined ohmic resistance values, thinner principal or main insulation coatings. It permits substantially more economical fabrication of the bar-winding and long insulation lifetimes.

These and other features of the invention are pointed out in the claims. Other objects and advantages of the invention will become evident from the following description when read in light of the accompanying drawings.

DESCRIPTION OF PREFERRED EMBODIMENTS

Figure 1:
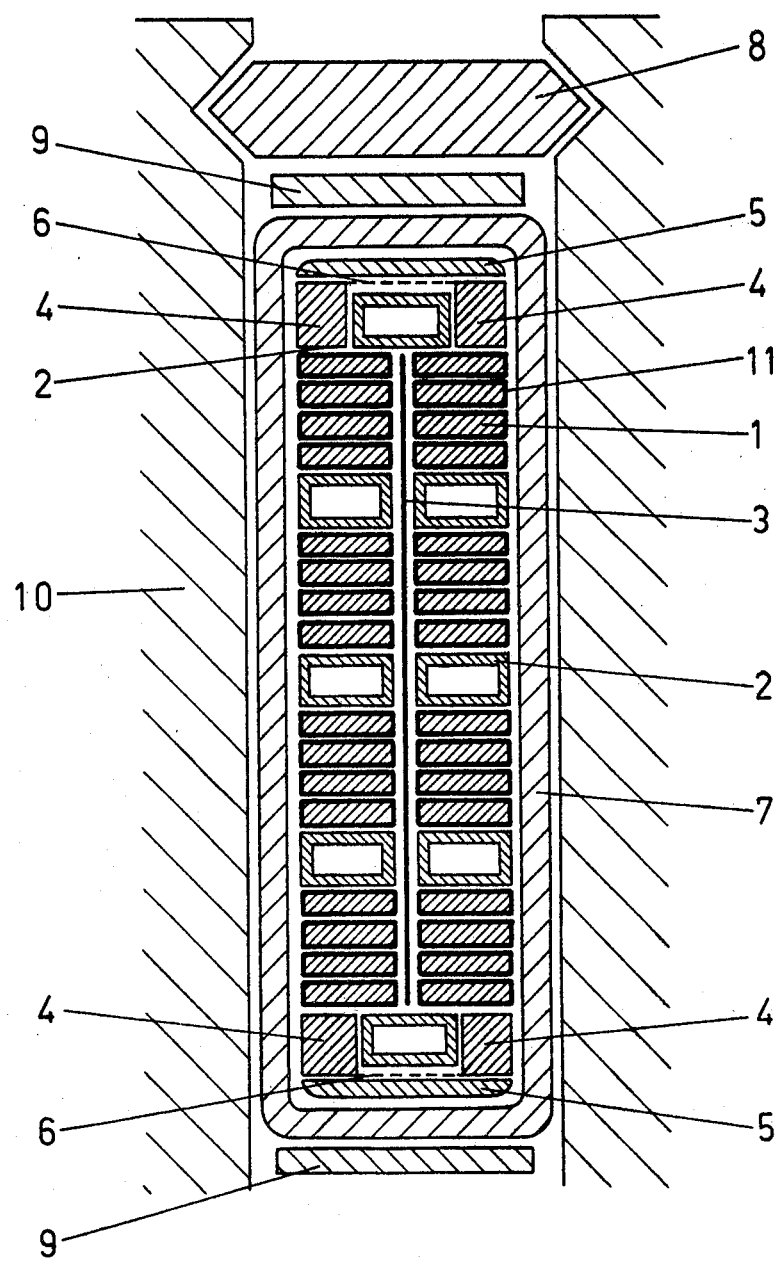
FIG. 1 is a cross-section showing somewhat schematically the construction of a Roebel bar embodying features of the invention.
Figure 2:
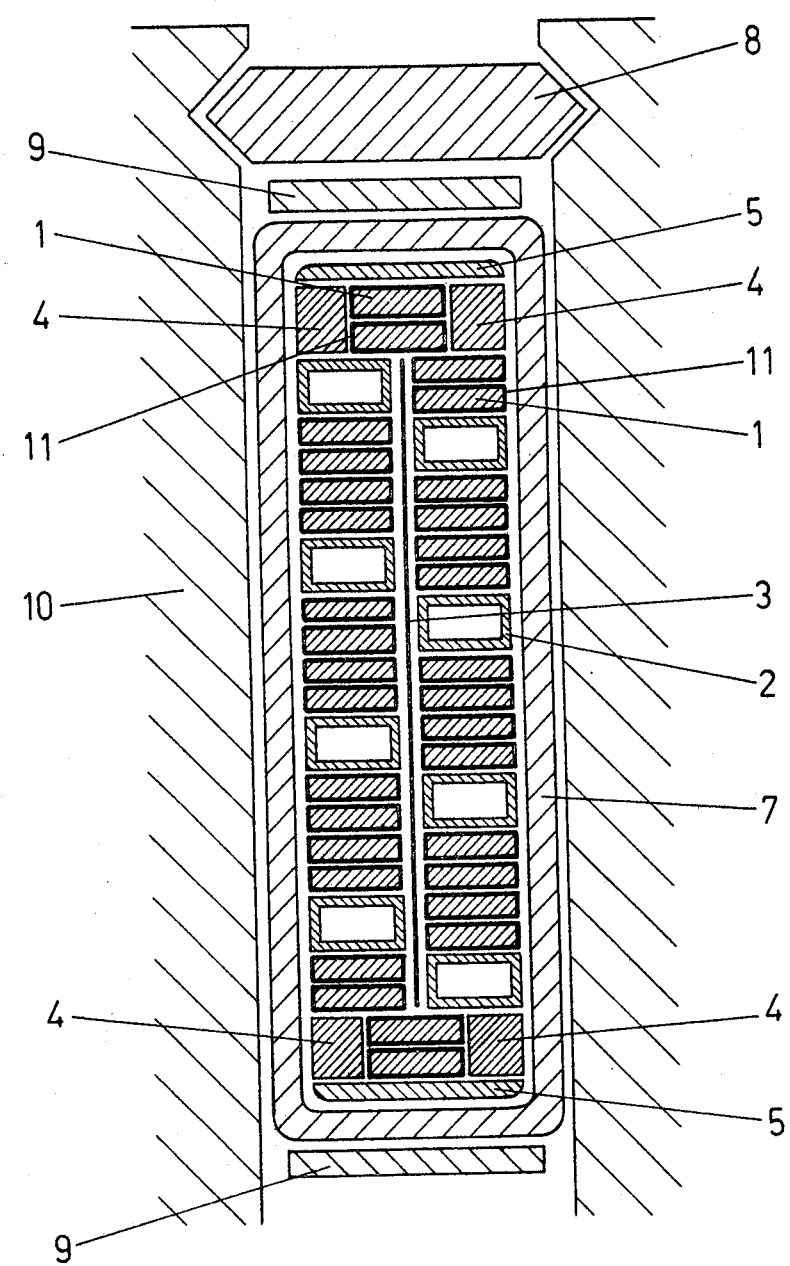
FIG. 2 is another section through the Roebel rod of FIG. 1.
Figure 3:
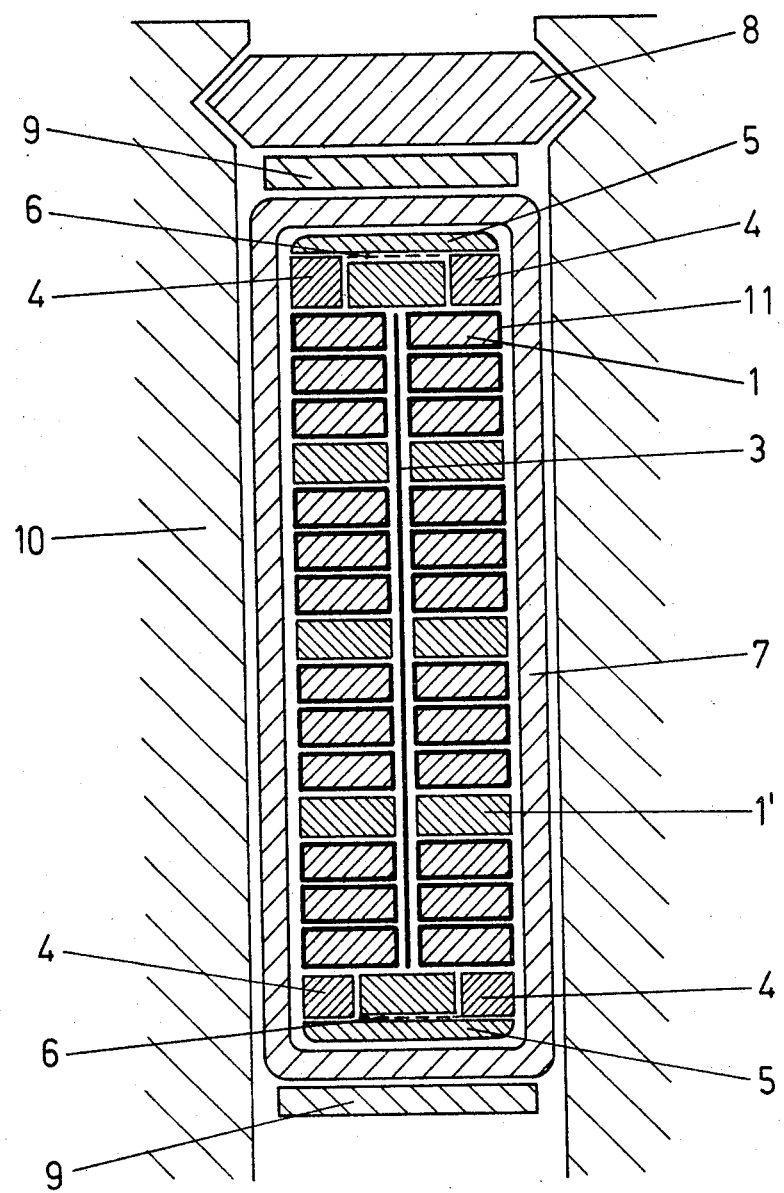
FIG. 3 is a cross section of another Roebel rod embodying features of the invention.

The insulated solid conductors of the bar winding are defined by the reference numeral 1. The reference numeral 2 indicates hollow conductors of the bar-winding. A laminar or sheet-like insulation layer is indicated by the numeral 3. A synthetic mica-resin putty is indicated by the reference numeral 4, an electrically conductive strip by the reference numeral 5 and an electrically conductive synthetic resin adhesive by the reference numeral 6. The principal or main-insulation of the bar winding is indicated by the reference numeral 7. A groove-sealing wedge is denoted by the numeral 8 and a spacer strip by the numeral 9. A steel shell is denoted by the reference numeral 10 and the insulation of the insulated solid conductors by the numeral 11. In FIGS. 2 and 3 like parts are denoted by the same reference numerals as in FIG. 1. In FIG. 3 bare uninsulated solid-conductors are denoted by the reference numeral 1'.

Figures 1A, 1B:
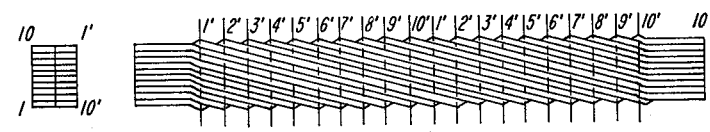
FIGS. 1A and 1B show the bar with twisted conductors.

FIGS. 1A and 1B show the twisting of the conductors.

The bar-winding described in FIG. 1 is composed of the twisted and insulated solid-conductors 1 and of the bar or uninsulated hollow conductors 2, which, due to the sheet-like insulation 3 form two separated conductor groups. Notches formed on the narrow edges of the bar winding (i.e., top and bottom in the drawing) caused by the twisting of the individual conductors 1,2 are filled out with synthetic mica-resin putty 4. The synthetic mica-resin putty 4 is preferably filled with 70% mica. The electrically conductive strip 5, which covers the bar-winding 1,2 is approximately 0.5 mm thick and preferably has a specific resistance of 50–150 ohm cm. According to one embodiment of the invention the electrically conductive strip 5 is composed of a glass-fiber strengthened synthetic material or plastic with an approximately 60% glass content. This plastic exhibits practically the same coefficient of expansion as the conductor material. The electrically conductive strip 5 can be roughened to improve adhesion with the bar 1,2 and with the main or principal insulation 7. The Roebel rod 1,2 provided with the main insulation 7 is held in the groove of the steel shell 10 by the groove-sealing wedge 8 and is provided with the spacer strips 9.

Another cross-section through the same Roebel rod as that of FIG. 1 is shown in FIG. 2. In this cross section, the insulated solid conductors 1 are disposed in the uppermost and lowermost positions. Here, too, the notches are filled by the synthetic mica-resin putty 4. The conductive adhesive between the electrically conductive strip 5 and the individual conductors of the Roebel rod is not required in the region shown. A cross-section through another Roebel rod composed only of solid conductors 1,1' is illustrated in FIG. 3. A bare or uninsulated solid conductor 1' always appears after three insulated solid conductors 1. In this case the notches are also filled with the synthetic mica-resin putty 4 and the electrically conductive synthetic resin adhesive 6 cements the uppermost and the lowermost solid conductors 1' to the electrically conductive strip 5. The remaining parts are equivalent to those shown in FIGS. 1 and 2.

The strip of synthetic mica-resin putty 4, is approximately half as thick as a bare or uninsulated hollow conductor 2, or as two bare or uninsulated conductors 1'. Its length at least matches the length of the groove. It is placed along the total length of the bar in a partially hardened condition (B-condition), then pressed therein for several minutes at a temperature of approximately 180 degrees C. and is then allowed to harden. In one embodiment, the electrically conductive strip 5 has a varying thickness in the longitudinal direction corresponding to the bar geometry. The individual conductors 1,1', 2 of the bar-winding are thus also cemented together and all the recesses or grooves formed on the narrow edges of the bar winding properly filled in. Subsequently, the electrically conductive strip 5 is cemented to the bare or uninsulated conductors 2 or 1' on the narrow edges of the bar-winding by means of the electrically conductive synthetic resin adhesive 6. This is followed by encircling the bar-winding with the main or principal insulation 7. Thus the rounded outer corners of the electrically conductive strip 5 permit improved application of the insulation ribbons or strips.

What is claimed is:

1. A bar-shaped winding member for electrical machines, comprising a plurality of insulated conductive strands, a plurality of uninsulated conductive strands, a synthetic mica-resin putty, an electrically conductive strip, an electrically conductive synthetic resin adhesive, said strands having lengths and being twisted along their lengths and forming an elongated structure having a length and a width as well as a thickness, the length of the structure being greater than the thickness, the thickness being greater than the width, said conductive strands forming an outer surface at the width, said conductive strands forming irregularities at the outer surface of the width, said conductive strands having the irregularities filled with said synthetic mica-resin putty and said uninsulated conductive strands being covered by said electrically conductive strip and being electrically connected to said strip by means of the electrically conductive synthetic resin adhesive, said strip including a glass-fiber reinforced synthetic material.

2. A member as in claim 1, wherein said strip includes rounded outer corners.

3. A member as in claim 1 or claim 2, wherein a plurality of said strands are solid and a plurality of said strands are hollow, said solid conductors having individual insulation.

* * * * *